(12) United States Patent
Taysom

(10) Patent No.: US 7,647,359 B1
(45) Date of Patent: Jan. 12, 2010

(54) TECHNIQUES FOR FILE SYSTEM TRANSLATION

(75) Inventor: Paul James Taysom, Provo, UT (US)

(73) Assignee: Novell, Inc., Provo, UT (US)

( * ) Notice: Subject to any disclaimer, the term of this patent is extended or adjusted under 35 U.S.C. 154(b) by 368 days.

(21) Appl. No.: 11/110,482

(22) Filed: Apr. 20, 2005

(51) Int. Cl.
G06F 17/30 (2006.01)

(52) U.S. Cl. ...................................... 707/200; 707/205
(58) Field of Classification Search ................ 707/201, 707/2, 4, 100, 200, 3, 10, 205; 715/523; 386/46
See application file for complete search history.

(56) References Cited

U.S. PATENT DOCUMENTS

| | | | |
|---|---|---|---|
| 4,642,758 A * | 2/1987 | Teng ........................... 707/10 |
| 4,956,809 A | 9/1990 | George et al. |
| 5,742,818 A | 4/1998 | Shoroff et al. |
| 5,983,240 A * | 11/1999 | Shoroff et al. .............. 707/200 |
| 5,991,753 A * | 11/1999 | Wilde ............................ 707/2 |
| 6,385,606 B2 * | 5/2002 | Inohara et al. ................. 707/4 |
| 6,397,232 B1 * | 5/2002 | Cheng-Hung et al. ....... 715/523 |
| 6,401,093 B1 | 6/2002 | Anand et al. |
| 6,404,975 B1 * | 6/2002 | Bopardikar et al. ........... 386/46 |
| 6,578,121 B1 | 6/2003 | Schutzman |
| 6,697,795 B2 | 2/2004 | Holcomb |
| 6,714,949 B1 * | 3/2004 | Frey, Jr. ...................... 707/200 |
| 6,721,764 B2 | 4/2004 | Hitz et al. |
| 6,760,823 B1 | 7/2004 | Schutzman |
| 6,862,601 B2 * | 3/2005 | Doney et al. ................ 707/101 |
| 6,871,245 B2 * | 3/2005 | Bradley ........................ 710/65 |
| 6,889,232 B2 * | 5/2005 | Pudipeddi et al. ........... 707/200 |
| 7,024,427 B2 * | 4/2006 | Bobbitt et al. .............. 707/200 |
| 2002/0065810 A1 * | 5/2002 | Bradley ........................ 707/2 |
| 2003/0110190 A1 * | 6/2003 | Achiwa et al. .............. 707/203 |
| 2004/0267830 A1 * | 12/2004 | Wong et al. ................. 707/200 |
| 2005/0175317 A1 * | 8/2005 | Chung et al. .................. 386/52 |
| 2005/0192974 A1 * | 9/2005 | DeLorme et al. ............ 707/100 |
| 2006/0277225 A1 * | 12/2006 | Mark et al. ................. 707/201 |

OTHER PUBLICATIONS

"Portlock Storage Manager for Novell Netware", *Solution Centre*, http://www.solutioncentre.co.uk/products.php, visited Apr. 12, 2005, Downloaded Apr. 12, 2005, (Copyright 2001), 1-4.

Ellis, Susan, et al., "Chapter 6. Creating and Growing Filesystems", http://bioloqy.ncsa.uiuc.edu/library/SGI_bookshelves/SGI_Admin/books/IA_DiskFiles/sgi_html/ch06.html, This excerpt is from the following reference. IRIX® Admin: Disks and Filesystems—http://biology.ncsa.uiuc.edu/library/SGI_bookshelves/SGI_Admin/books/IA_DiskFiles/sgi_html/front.html,(Web Pages),Copyright 1999-2002.

(Continued)

*Primary Examiner*—John R. Cottingham
*Assistant Examiner*—Sherief Badawi
(74) *Attorney, Agent, or Firm*—Schwegman, Lundberg & Woessner, P.a.

(57) ABSTRACT

Techniques for file system translation are provided. Access to a file of a first file system having a first format invokes a simultaneous access to a second file system in a second format. In an embodiment, a translation file system simultaneously maintains data on both a first file system and a second file system when accesses are made to the translation file system, the first file system, or the second file system.

5 Claims, 4 Drawing Sheets

OTHER PUBLICATIONS

Hewlett-Packard, "Appendix B: Converting File Systems", http://h30097.www3.hp.com/docs/base_doc/DOCUMENTATION/HTML/ADVFS_html/figures/admin-appb.html, (1996),Web Page.

Litt, Steve, "Converting Ext2 Filesystems to Ext3", http://www.troubleshooters.com/linux/ext2toext3.htm, (2003),Web Page.

Microsoft Corporation, "How to Convert FAT Disks to NTFS", http://www.microsoft.com/technet/prodtechnol/winxppro/maintain/convertfat.mspx, (Oct. 25, 2001),Web Page.

Novell, "Copying and Upgrading Legacy Volumes with Volume Copy Upgrade", *Excerpt from Open Enterprise Server by Novell*—Feb. 28, 2005 (http://www.novell.com/documentation/oes/pdfdoc/nss_enu/nss_enu.pdf), Novell Storage Systems File System Administration Guide,(Feb. 28 , 2005),1-6.

O'Donnell, Bob, "New Mac file system has nice improvements, but there's a gotcha", http://www.infoworld.com/cgi-bin/displayNew.pl?/odonnell/980202od.htm, (Feb. 2, 1998),Web Page.

Tzukanov, A T., "In-place file system conversion", http://tzukanov.narod.ru/convertfs/, Downloaded Apr. 12, 2005,(Jan. 13, 2005 (Last Update)),1 page.

\* cited by examiner

TECHNIQUES FOR FILE SYSTEM TRANSLATION

FIELD

The invention relates generally to file systems and more particularly to techniques for translating between file systems.

BACKGROUND

A file system refers to the way in which files are named and where and how the files are placed logically within storage for retrieval. A file system may include naming conventions, a security mechanism, and an interface that permits files to be created, retrieved, modified, or deleted. Some example naming conventions include a maximum number of characters for a file's name (e.g., 8 characters for a Disk Operating System (DOS), etc.) and a reserved extension or suffix for identifying a file's type (e.g., ".txt" for a text file type, ".csh" for an executable C programming shell script file type, etc.). An example security or authorization mechanism may include read and write access privileges which are associated with files of the file system.

Some file systems are logically organized as trees, hierarchies, or directories. For example, LINUX and UNIX include directory paths which are used to identify a location of a desired file (e.g., "/usr/paul/myfiles/file"). In short, a file system may be viewed as the software, the naming conventions, and the logical storage architecture used for storing and retrieving data from non volatile storage.

Migrating from one file system to a different file system can be a time and resource intensive exercise for an enterprise. This is so, because often disk storage systems are extremely large, such that some migrations can literally take days to complete. Moreover, when migration efforts are made, the source file system is unavailable for other uses. This can disrupt an enterprise's business and result in idle resources.

File system migration or interoperability may occur when an enterprise desires to move to an entirely different file system, when the enterprise desires to upgrade an existing file system, or when the enterprise desires to mirror or integrate across a plurality of disparate file systems. For example, many enterprises may desire to make their data available to a variety of platforms in order increase data visibility and ease of access.

Accordingly, improved techniques for file system translation are needed in order to improve the processing throughput and timeliness associated with file system migration and interoperability.

SUMMARY

In various embodiments, file system translation techniques are presented. More specifically, and in an embodiment, a read operation is received that requests access to a file located on a first file system. The file is accessed according to a first data storage arrangement of the first file system. Simultaneously, a write operation for the file is issued to a second file system according to a second data storage arrangement of the second file system, and a reference to the file is returned.

DETAILED DESCRIPTION

A "file system" includes a naming convention, a logical arrangement or architecture for data or files within storage, and an interface for storing and retrieving the files from the storage. A "file" includes a logical grouping of data that can be identified within a file system with an identifier that comports with the naming convention. The terms "document" and "file" may be used synonymously herein.

With various embodiments, reference is made to a first file system and to a second file system, these two file systems may be considered to be different or disparate from one another or may be considered compatible with one another in some manners. For example, in some cases, this means that the two file systems are entirely different from one another, such as DOS and a journaling file system (e.g., JFS, etc.). In other cases, this means that one of the two file systems is an upgrade or different version of the other file system (e.g., EXT2 and EXT3, etc.).

Various embodiments of this invention can be implemented in existing network products and services or new custom products or services. For example, in some embodiments, the techniques presented herein are implemented in whole or in part in the Novell® Storage Services™ products, Loadable Storage Subsystem modules, and/or the Virtual File System for SuSE® LINUX distributed by Novell®, Inc., of Provo, Utah.

Of course, the embodiments of the invention can be implemented in a variety of architectural platforms, operating and file systems, or applications. For example, portions of this invention can be implemented in whole or in part in any Virtual File System (VFS), Cluster File System (CFS), Operation System (OS) kernel, storage device interface, and the like. Any particular architectural layout or implementation presented herein is provided for purposes of illustration and comprehension only and is not intended to limit aspects of the invention.

Figure 1:
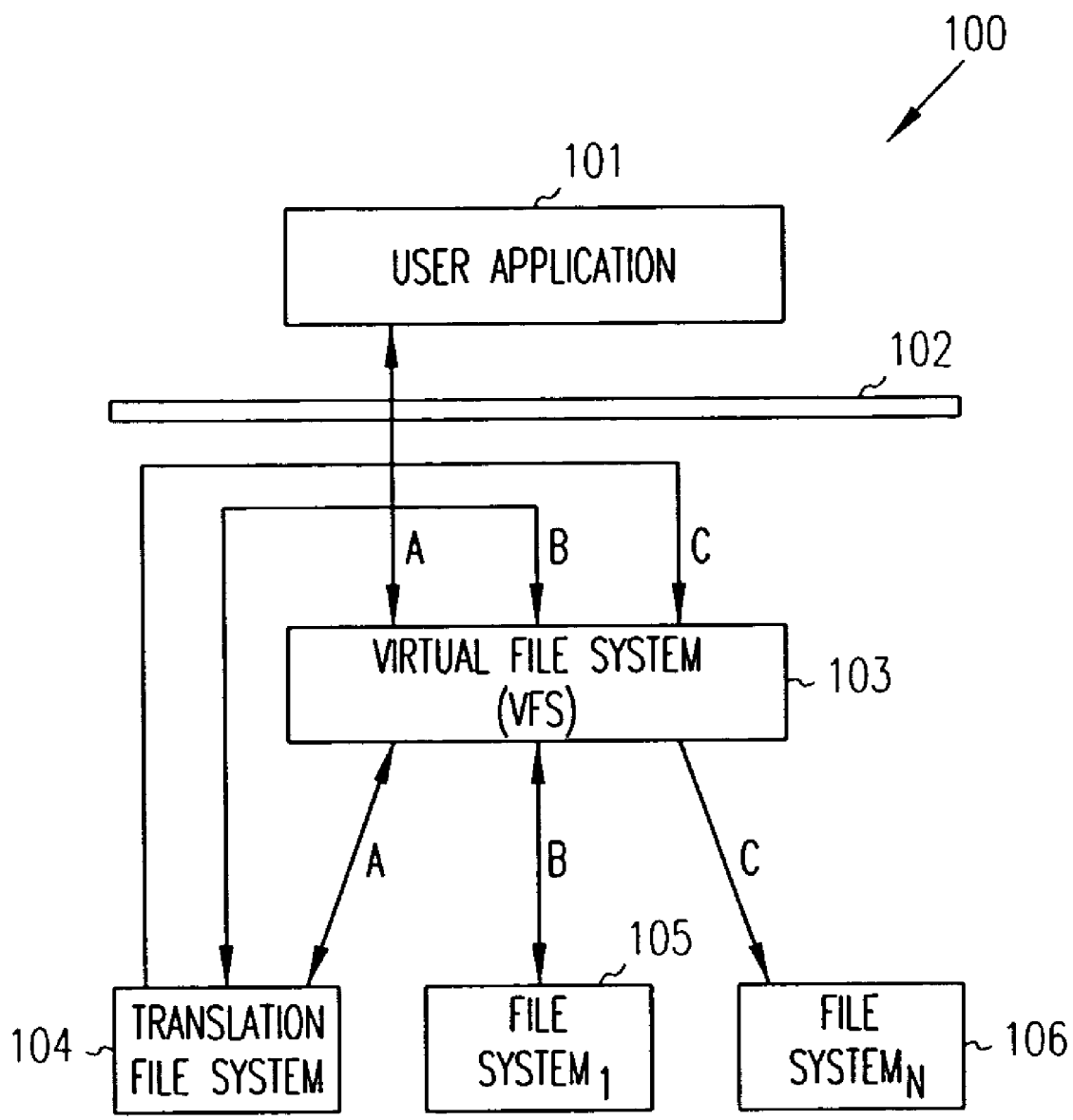
FIG. 1 is a diagram of a file system translation architecture, according to an example embodiment.

FIG. 1 is a diagram of a file system translation architecture 100, according to an example embodiment. The architecture 100 is implemented in a machine-accessible and readable medium and is optionally accessible over a network. The file system architecture 100 facilitates real-time and dynamic translation of files (e.g., data) from one file system to another file system.

The architecture 100 includes a user application 101, an OS 102, a VFS 103, a translation file system 104, a first file system 105, and a second file system 106. The interaction of the components 101-106 of the architecture 100 will now be discussed with reference to an example processing flow identified by the labels A, B, and C in FIG. 1.

Initially, a user application 101 is executing within an OS 102 on a machine. The application 101 requests a file (A in FIG. 1) located within storage, which is accessible to the machine. The OS 102 redirects the application 101 request A to the VFS 103 for processing. Under conventional techniques, the request A, which is directed to the first file system 105, would pass through the VFS 103 directly to a device driver interface associated with the first file system 103 and the file would be returned to the user application 101 from storage. With embodiments of this invention, this conventional processing is altered in a novel manner.

The VFS 103 redirects or sends the request A to a translation file system 104. The translation file system 104 then issues a modified request B back through the VFS 103 for the desired file. The VFS 103 uses a device driver associated with the first file system 105 to pass the request B onto the first file system 105 for processing. The first file system 105 retrieves the desired file from storage. The file may then be returned to the user application and simultaneously provided to the translation file system 104.

The translation file system 104 uses the data associated with the returned data file to simultaneously and in real-time to issue a dynamic write request C to a second file system 106. The VFS 103 uses a device driver associated with the second file system 106 to force a write within storage for the desired file in a second file system format. The user application 101 is unaware of the translation that takes place during the initial read request A. That is, the user application 101 makes a read request A for a file, which it believes to be located in the first file system 105, and unbeknownst to the user application 101 the returned file is immediately and dynamically translated and written to a second file system 106. In this manner, the same user application 101 or a different user application may subsequently request the same file using a second file system format and the file will be available from storage.

The architecture 100 of FIG. 1 is presented for illustration only and should not be considered to limit the teachings provided herein, since a variety of modifications are possible. For example, the user application 101 may use a translation file system interface to directly communicate a request for a desired file to the translation file system 104. In another modification, the VFS 103 may include the processing associated with the translation file system 104 or vice versa.

In another embodiment, the VFS 103 and the translation file system 104 may cooperate to ensure that the files associated with the first file system 105 and the second file system 106 are stored uniquely within storage. One technique for doing this is to use a map that identifies the storage partitioning and naming conventions expected by each of the file systems 105 and 106 for files and to provide pointers within that map to a specific location within storage to retrieve files for specific file systems 105 and 106. Accordingly, multiple and disparate file systems 105 and 106 may be serviced from a single storage device.

The architecture 100 permits a first file system 105 to be dynamically morphed into a second file system 106 and while this is occurring the user application 101 still has access to desired files. Thus, file system migration and interoperability are achieved in timely and processing efficient manners. The architecture 100 is particularly beneficial when an enterprise desires to upgrade from a first file system 105 to a second file system 106 because the upgrade can dynamically take place as the data is accessed.

It should also be reiterated and noted again that the VFS 103 component of the architecture 100 is optional meaning that the translation file system 104 alone or in cooperation with other OS 102 services may directly access the first and second file systems 105 and 106.

Figure 2:
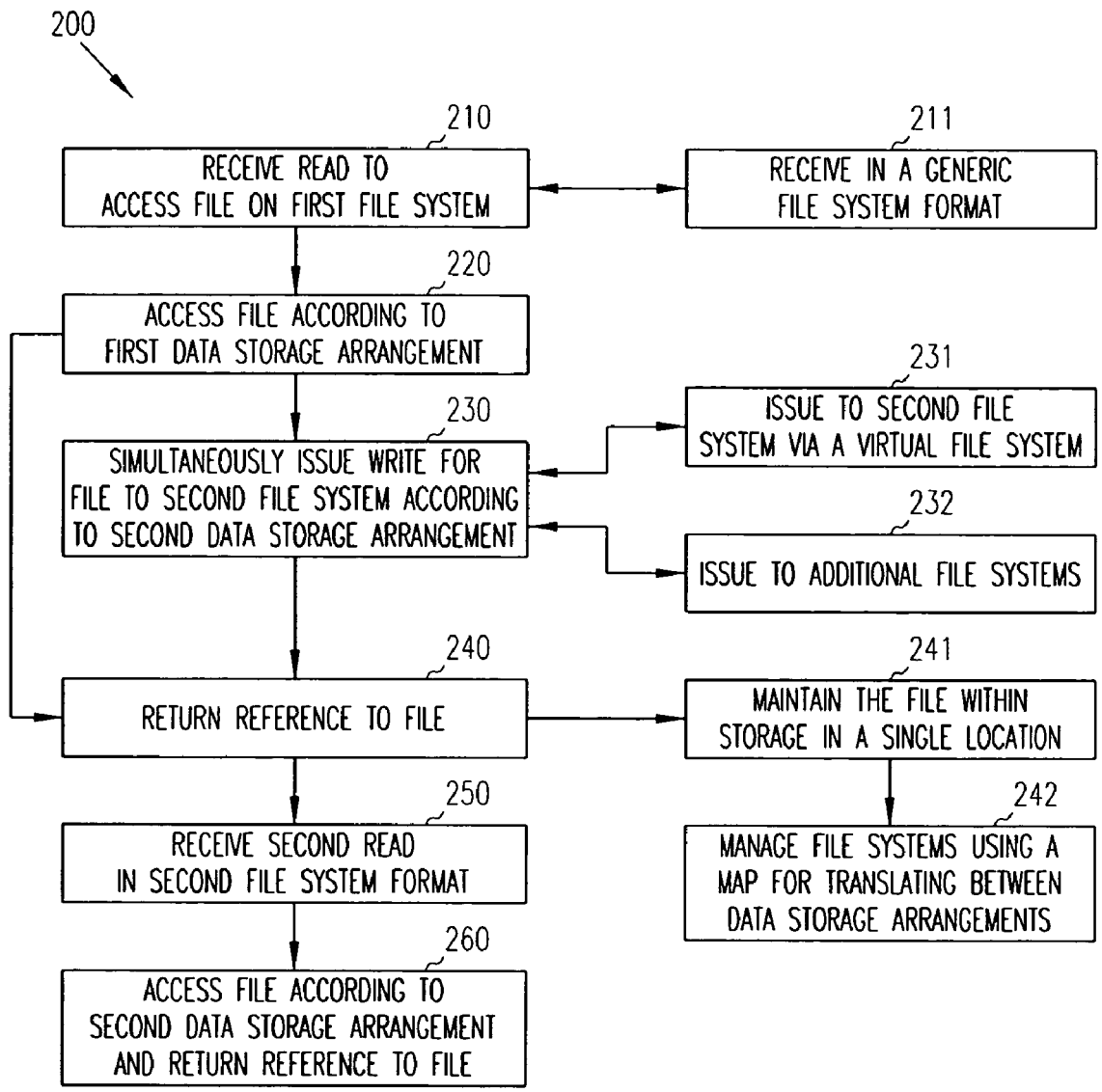
FIG. 2 is a diagram of a method for file system translation, according to an example embodiment.

FIG. 2 is a diagram of a method 200 for file system translation, according to an example embodiment. The method 200 (herein after referred to as "file system translation service") is implemented in a machine-accessible and readable medium and is optionally accessible over a network. The network may be wired, wireless, or a combination of wired and wireless.

In an embodiment, the file system translation service may be implemented as the translation file system 104 of FIG. 1. In an alternative embodiment, the file system translation service may be implemented as a modified version or service associated with the VFS 103 of FIG. 1. In still other embodiments, the file system translation service is implemented as a combination of the translation file system 104 and the VFS 103 of FIG. 1.

Initially, the file system translation service is interposed between a first and second file system. This may occur in a direct manner, such as when a user application uses an interfaced designed to directly interact with the file system translation service. It may also occur in an indirect manner, such as when a user application uses interfaces associated with a specific file system and is redirected to the file system translation service unbeknownst to the user application.

Once the file system translation service is interposed between the first and second file systems, at 210, and at some point in processing a read operation is received from a user application. The read operation is directed towards acquiring a desired file from storage. The read operation may be received in a first file system format. Alternatively, at 211, the read operation may be received in a generic file system format.

At 220, the file system translation service accesses the file associated with the read operation from a first file system. To do this, the file system translation service uses an interface or device driver associated with the first file system. The interface or device driver comports with the data storage arrangement expected and used by the first file system. That is, each different file system will partition storage in its own manner; so, the file system translation service accesses the file defined by the read operation according to that first data storage arrangement associated with the first file system.

In an embodiment, the file system translation service may enlist a VFS to access the file from the first file system on its behalf. In an alternative embodiment, the file system translation service accesses the file by directly interacting with the first file system.

At 230, the file system translation service simultaneously and dynamically issues a write operation for the acquired file to an interface associated with a second file system. The write operation comports with a second data storage arrangement expected by the second file system. The write operation is transparent to the user application that submitted the initial read operation for the file.

In an embodiment, at 231, this may be achieved by the file system translation service issuing the write request to the second file system via a VFS. Alternatively and similar to the read operation access of 220, the file system translation service may directly issue the write request to the second file system without the assistance of a VFS.

According to an embodiment, at 232, the file system translation service may simultaneously and dynamically issue the write operation for the file to a plurality of additional file systems in data storage formats expected by each of those additional file systems. In this manner, a single file system (first file system) may be morphed (translated) to a plurality of different file systems (first file system and additional file systems) as files are accessed from the first file system.

At 240, the file system translation service returns to the original user application a reference to the file within storage. It is noted that, the reference to the file may be returned to the user application as soon as it is accessed or acquired by the file system translation service. Thus, the reference to the file may be returned to the user application while the file system translation service issues the write operation for the file to the second file system.

In an embodiment, at 241, the file may be maintained within storage in a single location. In other words, even though the file is morphed or translated automatically and dynamically from the first file system to the second file system, the file's data only resides within storage in a single location and is not duplicated within the storage. One technique for achieving this, at 242, is using metadata, such as a map, that translates how one file system expects a file to appear within storage to that files actual location within the storage. The format of the actual storage may support the first file system, the second file system, or an entirely different or translation file system. The map is used to translate from one file system to a specific location within the storage using the file system actually supported by the storage. In this manner, a file may be morphed from the first file system to the second file system by making an entry within the map for the file in the second file system's format along with a pointer to the actual physical location of the file within the storage.

Once a file is morphed or translated from the first file system to the second file system, at 250, a user application may issue a read operation or any other operation, such as delete, for the file using the second file system's format or interface. At 260, the file system translation service accesses the file according to the data storage arrangement expected by the second file system and returns a reference to the file. If an operation is destructive, such as a write, create, modify, or delete, then it is noted that the file system translation service may duplicate the operation back to the first file system to ensure that the two file systems are in synchronization with one another. Although, such a duplicate operation is not necessary if the file is stored uniquely and singularly within storage.

The processing of the file system translation service depicted by the method 200 of FIG. 2 demonstrates how files or data may be dynamically and automatically morphed or translated from one file system to one or more additional file systems in timely and processing efficient manners.

In an embodiment, the processing of the method 200 may be iteratively processed by an automated service for purposes of migrating from one file system to another file system. That is, the read to access the file at 210 may be submitted by an automated application or service for purposes of migrating from one file system to another file system, and while the migration is occurring the source file system is available for use.

Figure 3:
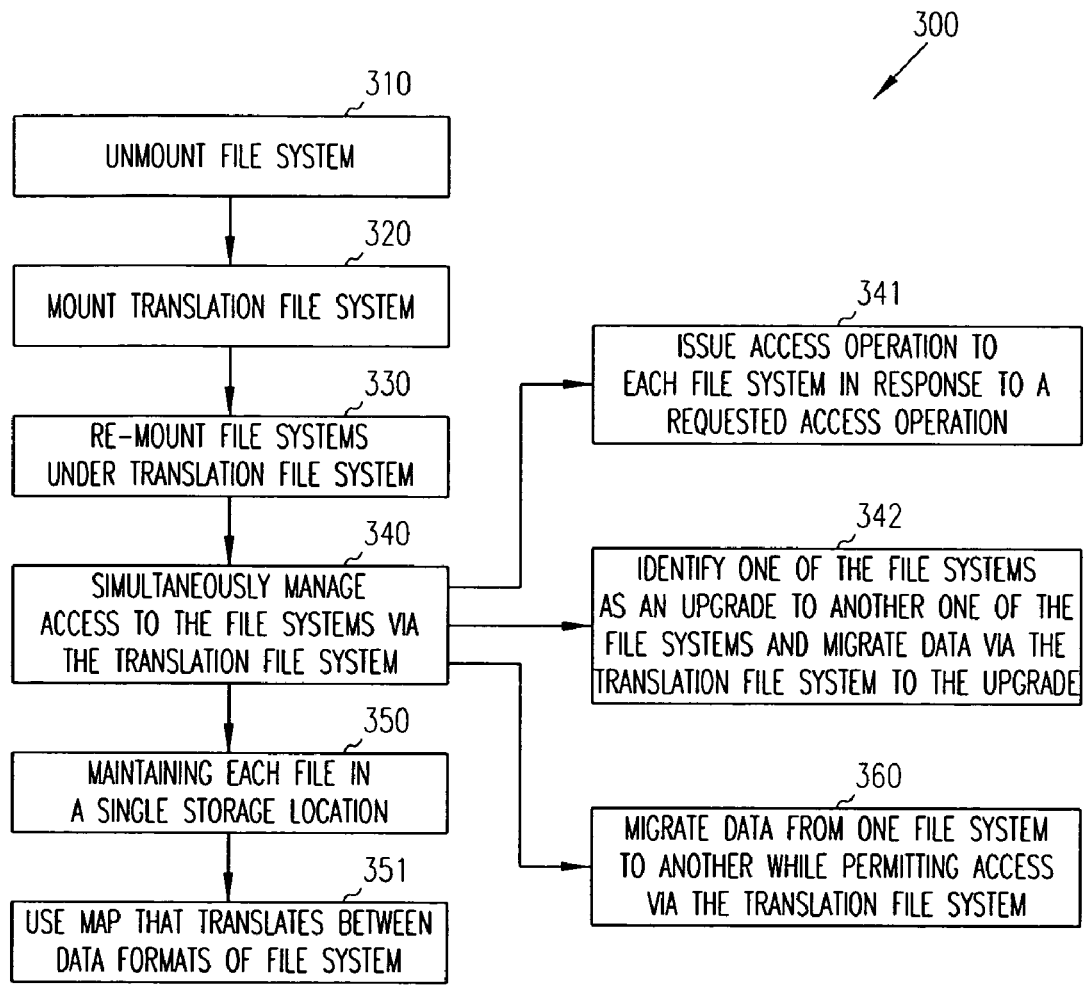
FIG. 3 is a diagram of another method for file system translation, according to an example embodiment.

FIG. 3 is a diagram of another method 300 for file system translation, according to an example embodiment. The method 300 (hereinafter referred to as "file system morphing service") is implemented in a machine-accessible and readable medium and is optionally accessible over a network.

The processing of the file system morphing service differs from the processing of the method 200 of FIG. 2 in that the file system morphing service provides a technique for integrating a file system translator service into an existing machine architecture that utilizes mounts for devices.

At 310, the file system morphing service is used to initially unmount a plurality of file systems from an existing machine architecture. This is a temporary condition used for purposes of initializing and configuring the file system morphing service for subsequent processing. At 320, the file system morphing service mounts a translation file system. In an embodiment, the translation file system that is mounted is the translation file system 104 of architecture 100 depicted in FIG. 1. At 330, the file system morphing service then remounts the previously unmounted file systems underneath the translation file system. The processing at 310-330 provides a mechanism to initially interpose the translation file system between a user application's environment and the file systems. Hierarchically, the translation file system becomes a parent directory or parent file system to the children directories or children file systems. Thus, access to a specific file system must first traverse through the translation file system.

Once the translation file system and remaining file systems are properly configured, at 340, the file system morphing service dynamically and simultaneously manages access to the file systems mounted underneath the translation file system via the translation file system. Techniques for achieving this were discussed above with respect to the architecture 100 of FIG. 1 and the method 200 of FIG. 2.

For example, at 341, the file system morphing service may issue an independent access operation to each file system mounted under the translation file system in response to a single access operation received from a user application. The user-generated access operation may have initially been directed to a specific file system mounted under the translation file system or may have been initially directed to the translation file system.

In an embodiment, at 342, the file system morphing service may identify one of the file systems mounted under the translation file system as an upgrade to another one of the file systems also mounted under the translation file system. The translation file system is used to upgrade to the newer file system as data or files are accessed from the older file system. Thus, an upgrade to a newer file system may be achieved gradually and while it is occurring access to the underlying data or files remains available to an enterprise.

In an embodiment, at 350, the file system morphing service may maintain each file within a single storage location on storage. This may be achieved in manners similar to what was discussed above with respect to the method 200 of FIG. 2. For example, at 351, a map (metadata) may be used to translate between disparate data formats expected by each of the file systems to a single unique storage location on non volatile storage.

At 360, the file system morphing service may be used to dynamically and gradually migrate from one file system to another file system. The file systems are both mounted under the translation file system and are disparate from one another (e.g., DOS versus JFS, etc.). Access to the source file system remains available to user applications while the migration is taking place to the target file system.

In some arrangements, migration may be kicked off by an automated application, such that the source file system is continuously accessed and the target file system written for each file on the source file system. Access to the source file system is available to users while the automated application dynamically and in real-time accesses the source file system prompting the method 300 to migrate and write to the target file system.

Figure 4:
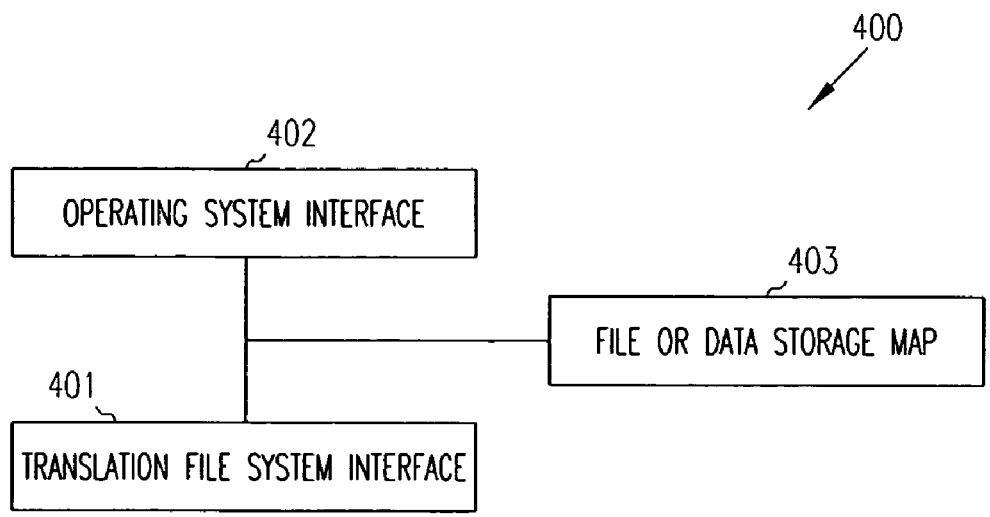
FIG. 4 is a diagram of a translation file system, according to an example embodiment.

FIG. 4 is a diagram of a translation file system 400, according to an example embodiment. The translation file system 400 is implemented in a machine-accessible and readable medium and is optionally accessible over a network. In an embodiment, the translation file system 400 implements, among other things the processing of the method 200 depicted in FIG. 2.

The translation file system 400 includes a translation file system interface 401 and an OS interface 402. In some cases, the translation file system 400 may also include a file or data storage map or metadata 403. Each of these will now be discussed in turn.

The translation file system interface 401 provides a set of services that interact with the OS interface 402 for purposes of translating between two or more different file systems. Requests for file accesses are directed from the OS interface 402 to the translation file system interface 401, if received from by the OS interface 402. Alternatively, the translation file system interface 401 may directly receive requests for files, in which case the translation file system interface 401 uses the OS interface 402 to communicate with specific file systems.

The translation file system interface 401 accesses files located on specific file systems utilizing the OS interface 402. The acquired files are then delivered to the initial requesting user application and simultaneously and dynamically submitted back to the OS interface 402 as a write operation to a different file system. In this manner, files are automatically and dynamically morphed or translated from one file system format to another file system format. The ability to achieve this is achieved with the translation file system interface 401, which leverages the operating system interface 402.

The operating system interface 402 maintains interfaces to device drivers associated with specific storage devices and specific file systems. It is capable of using a device driver of a desired file system to store and retrieve files for a specific file system when a request is in the specific file system format. An example, operating system interface 402 may be a VFS bundled with the UNIX and LINUX operating systems.

Of course it is understood, that the operating system interface 402 is not limited to a VFS, since it may be any lower level OS interface 402 that permits the generic system interface 401 to access device drivers of specific file systems without having to maintain knowledge about the device drivers. In other words, the OS interface 402 serves the translation file system interface 401 by providing a higher level interface to file systems and their corresponding storage devices, such that the specifics of each storage device's interface does not need to be managed by the translation file system interface 401.

In an embodiment, the translation file system 400 also includes a file or data storage map or metadata 403. The map 403 may be used by the translation file system interface 401 and the OS interface 402 for purposes of maintaining a single file on a single storage device in a single location even though that file is accessible via a plurality of different file system interfaces. A way to achieve this was discussed above with respect to the method 200 of FIG. 2.

The map 403 provides multiple data storage arrangements for a single file. Each arrangement corresponds to a specific file system and what it expects. With each arrangement there is also a pointer to the actual location within storage where the file may be retrieved. In some embodiments, a single map 403 exists for each different file system. In other cases, a single map 403 integrates the data storage arrangements expected by a plurality of different file systems.

In cases where files are stored uniquely within storage, the translation file system interface 401 does not have to propagate volatile access operations (e.g., write, delete, create, etc.) for purposes of keeping the data within the storage synchronized. This is so, because the data appears only once within storage and when it is modified the changes will be reflected regardless of the file system interface or format used to acquire the data.

Conversely, if files are stored separately within storage devices, such that there are copies of a single file for each unique file system being supported, then the translation file system interface 401 can propagate a volatile operation that takes place with one file system to storage devices or locations associated with the other remaining file systems. This permits synchronization of files that are being mirrored on multiple storage devices or within multiple storage locations within a same storage device which is partitioned in different manners for each different file system.

Figure 5:
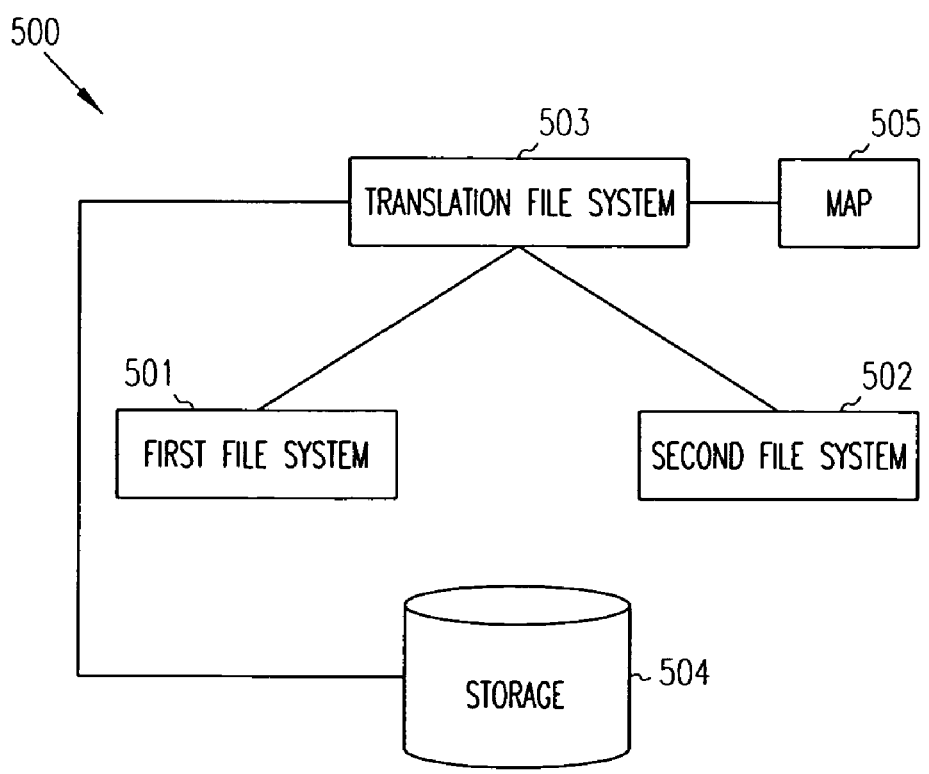
FIG. 5 is a diagram of another translation file system, according to an example embodiment.

FIG. 5 is a diagram of another translation file system 500, according to an example embodiment. The file system 500 is implemented in a machine-accessible and readable medium and is optionally accessible over a network. In an embodiment, the file system 500 implements, among other things, the method 300 of FIG. 3.

The file system 500 includes a first file system 501, a second file system 502, and a translation file system 503. In some embodiments, the file system 500 may also include a storage device 504 and a map 505.

The first and second file systems 501 and 502 are mounted under the translation file system 503. Thus, access to the first 501 or second 502 file system occurs by going through interfaces associated with the translation file system 503. A mechanism for achieving this arrangement of the file systems 501-503 was discussed above with the method 300 of FIG. 3.

The translation file system 503 handles access operations that are directed to the first 501 and second 502 file systems. That is, a user application may issue file access operations to the first file system 501 or the second file system 502 and the translation file system 503 detects and initially processes these requests. In an alternative embodiment, the user application directly interacts with the translation file system 503 via a translation file system interface that is independent of any particular or specific file system.

The translation file system 503 stores and retrieves files or data from the first file system 501 and provides references to those files back to the requesting user application. Simultaneously, the translation file system 503 issues a write operation to the second file system 502, if the files are not already represented or available within the second file system 502.

Likewise, the translation file system 503 stores and retrieves files or data from the second file system 502 and provides references to those files back to the requesting user application. Concurrently, the translation file system 503 issues a write operation to the first file system 501, if the files are not already represented or available within the first file system 501.

Thus, the translation file system 503 dynamically and automatically manages files and accesses to files for both the first 501 and second 502 file systems. User applications may access the files, create files, modify files, and delete files using syntaxes and formats associated with the first 501, the second 502, or the generic 503 file systems. Additionally, files may be gradually migrated from one file system to another file system, such that migration occurs as access to the files are made via the translation file system 503.

In an embodiment, the file system 500 also includes a storage device 504. Each piece of data or file within the storage 504 is stored once within the storage 504 and is accessible via the translation file system 503 from a user application using access operations in formats associated with the first 501 or second 502 file systems. A technique for achieving this uses a map 505 that maintains data storage formats expected by both the first 501 and second 502 file systems along with a pointer into the storage 504 for acquiring the specific location of a file.

It is now appreciated how file systems may be dynamically and automatically translated as a file is accessed from one of the file systems. The approaches and techniques presented herein are more timely and processing efficient than conventional approaches and provide for improved file system migration and interoperability.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and to execute on a computer to perform the method, comprising:
   receiving a read operation from a user application to access a file located on a first file system, wherein the user desires to acquire the file from storage associated with the first file system, and wherein the read operation is received by an operating system and passed to a virtual file system (VFS) for processing;
   accessing, by the VFS, the file according to a first data storage arrangement of the first file system;
   simultaneously, automatically, and dynamically and in real time issuing a write operation for the file to a plurality of additional file systems in data storage formats expected by each of those additional file systems when the file is not already available in the additional file systems, and wherein the write operation is transparent to the user application and occurs dynamically and in real time as the file is being accessed form the first file system, and wherein the user application is unaware of the write operation, and wherein and migration of the first file system to the additional file systems occurs in real time as access to the file is made by the user application in the first file system and in response to the read operation made by the user application to access that file in the first file system, wherein the VFS is modified to issue write operations for the file in the additional file systems to a translation file system and the translation file system processes the write operations for the file in the additional file systems; and
   returning a reference to the file while the write operation processes against the additional file systems.

2. The method of claim 1 further comprising:
   maintaining the file within storage in a single location; and
   managing the first and additional file systems using a map that corresponds to the first data storage arrangement of the first file system and the second data storage arrangements of the additional file systems.

3. The method of claim 1, wherein receiving further includes receiving the read operation in a generic file system format independent of the first and additional file systems.

4. The method of claim 1 further comprising:
   receiving a second read operation for the file in a second file system format;
   accessing the file according to a second data storage arrangement; and
   returning a reference to the file.

5. The method of claim 1 further comprising, iterating the processing of the method to migrate remaining files located on the first file system to the additional file systems wherein access to the first file system is permitted during the migration.

* * * * *

UNITED STATES PATENT AND TRADEMARK OFFICE
CERTIFICATE OF CORRECTION

PATENT NO. : 7,647,359 B1 Page 1 of 1
APPLICATION NO. : 11/110482
DATED : January 12, 2010
INVENTOR(S) : Paul J. Taysom It is certified that error appears in the above-identified patent and that said Letters Patent is hereby corrected as shown below:

On the title page, item (56), under "U.S. Patents Documents", in column 1, line 7, delete "715/523" and insert -- 715/203 --, therefor.

On the title page, item (56), under "Other Publications", in column 2, line 5, delete "bioloqy." and insert -- biology. --, therefor.

On the title page, item (74), in "Attorney, Agent or Firm", in column 2, line 2, delete "P.a." and insert -- P.A. --, therefor.

In column 10, line 5, in Claim 1, delete "form" and insert -- from --, therefor.

Signed and Sealed this

Sixteenth Day of March, 2010

David J. Kappos
*Director of the United States Patent and Trademark Office*